(12) United States Patent
Chong et al.

(10) Patent No.: US 6,546,394 B1
(45) Date of Patent: Apr. 8, 2003

(54) DATABASE SYSTEM HAVING LOGICAL ROW IDENTIFIERS

(75) Inventors: Eugene I. Chong, Concord, MA (US); Souripriya Das, Nashua, NH (US); Charles G. Freiwald, Amherst, NH (US); Aravind Yalamanchi, Nashua, NH (US); Ramkumar Krishnan, Nashua, NH (US); Jagannathan Srinivasan, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/473,073

(22) Filed: Dec. 28, 1999

(51) Int. Cl.⁷ .............................................. G06F 17/30
(52) U.S. Cl. ..................................................... 707/100
(58) Field of Search ............................. 707/1, 2, 3, 100

(56) References Cited

U.S. PATENT DOCUMENTS

| | | | | |
|---|---|---|---|---|
| 5,515,531 A | * | 5/1996 | Fujiwara et al. ................ 707/3 |
| 5,594,899 A | * | 1/1997 | Knudsen et al. ................ 707/2 |
| 5,742,809 A | * | 4/1998 | Hayashi et al. ............. 707/100 |
| 6,266,660 B1 | * | 7/2001 | Liu et al. ........................ 707/1 |

* cited by examiner

Primary Examiner—Safet Metjahic
Assistant Examiner—Cam-Linh T. Nguyen
(74) Attorney, Agent, or Firm—Hamilton, Brook, Smith & Reynolds, P.C.

(57) ABSTRACT

A database system having logical row identifiers (rowids) includes a secondary index which is traversed to locate a secondary index entry that includes a target secondary key value. Each secondary index entry also includes a logical rowid element. Each logical rowid element has both a primary key value element, and a datablock address element identifying a leaf block in an index-organized table that likely includes a row corresponding to the primary key value element. The leaf block is scanned to locate the row in the index-organized table that includes the target secondary key value and corresponds with the located, secondary index entry. A primary key scan is performed on the index-organized table if the row in the index-organized table is not located in the identified datablock.

26 Claims, 6 Drawing Sheets

DATABASE SYSTEM HAVING LOGICAL ROW IDENTIFIERS

BACKGROUND

In a typical relational database system, users store, update and retrieve information by interacting with user applications ("clients"). The client responds to the user's interaction by submitting commands to a database application responsible for maintaining the database (a "database server"). The database server responds to the commands by performing the specified actions on the database. To be correctly processed, the commands must comply with the database language that is supported by the database server. One popular database language is known as Structured Query Language (SQL).

Various access methods may be used to retrieve data from a database. The access methods used to retrieve data may significantly affect the speed of the retrieval and the amount of resources consumed during the retrieval process. Many information retrieval applications make use of indexes when performing content-based searches on the database data. Typically, such indexes are implemented using a heap-organized table and a B-tree index. The index is typically built on the columns of the table, each index entry in the index having the form <column_value(s), rowid> comprising the columns values which make up the index key, and a rowid which uniquely identifies the row within the table that corresponds to the index entry.

Many applications involve data sets in which individual rows are identified by a primary key. The primary key uniquely identifies each row within the table and may be formed from a single column such as a social security number for employees or may be formed from multiple columns such as an area code plus a seven digit local phone number. For such a table, a primary key index can be used. Entries within the primary key index may have the form <primary key value(s), rowid>. A primary key index provides good query performance when only indexed columns are referenced in the query, so-called index-only scans. If non-indexed columns are referenced, an index-based scan may be used. In an index-based scan, the primary key index structure is traversed to obtain a rowid which is then used to access the rows within the table structure.

To speed up primary key-based retrieval efforts as well as to avoid duplication of the primary key values, an index-organized table has been introduced which includes not only the indexed column values, but also all the remaining column values of the table in the leaves of the index structure, thus rendering maintenance of a separate table unnecessary. Each row, therefore, includes both key and non-key columns, the non-key columns being stored along with the key columns. As a result, index-organized tables do not incur additional Input/Output (I/O) overhead to access the non-key columns as with a conventional table's index based scan.

As with a conventional heap organized table/index pair, an index-organized table provides good query performance for data included in the column or columns forming the primary key. To aid in the retrieval efforts of queries based on non-primary key columns, secondary index structures may be provided. Entries within the secondary structure have the form <secondary key value, primary key value>. For index-only scans, data may be extracted directly from the secondary index structure. For index-based scans, the secondary index structure is first traversed to obtain the corresponding primary key value which is then used in a primary key index scan of the index-organized table to obtain values from other columns which are of interest.

SUMMARY

As described above, secondary index-based scans require traversal of the primary key index structure to access the pertinent database row as opposed to a single additional I/O for conventional heap-organized tables. In conventional heap organized table/index pairs, an index entry includes a row identifier (rowid). Typically, the rowid is a physical address of the row, which uniquely identifies the row within the table that corresponds to the entry. As a result, once the entry in the index is identified, the rowid provides the location in the table which includes the data for the remaining columns. As a result, rowids provide the fastest possible access to a row in a given table.

Rows in index-organized tables do not have a permanent address as they are stored in the index leaf blocks in sort order and may move around in order to retain that order. As a result, secondary indexes including traditional rowids are not possible. As a substitute, a secondary index entry can include a logical rowid. The logical rowid may include the primary key value as well as a physical leaf block address. The leaf block address identifies a primary key index leaf block which most likely contains the row.

Accordingly, a particular method for using a secondary index to locate a row in an index-organized table includes traversing the secondary index to locate a secondary index entry that includes a target secondary key value. Each secondary index entry also includes a logical rowid element. In one embodiment, each logical rowid element has both a primary key value element, and a datablock address element identifying a leaf block in the index-organized table that most likely includes a row corresponding to the primary key value element.

The leaf block identified by the logical rowid value of the located secondary index entry is accessed in the index-organized table. The leaf block is scanned to locate the row in the index-organized table that includes the target secondary key value and corresponds with the located, secondary index entry.

A primary key scan is performed on the index-organized table if the target row in the index-organized table is not located in the identified block.

In addition, in at least one embodiment, statistics are gathered which represent an accuracy of the logical rowid value, by calculating an accuracy ratio for the logical rowid. The accuracy ratio represents a complement of a number of times a primary key scan is performed versus a number of times the leaf block in the index-organized table is accessed.

In processing a subsequent database query statement that references the target secondary key value, a determination is made, in response to the statistics, as to whether the database query statement will be serviced using the secondary index with or without a leaf block address, or whether the database query statement will be serviced by performing a primary key scan on the index-organized table.

In another embodiment of the present invention, an in-memory, large object locator in a database management system includes a large object identifier, and a logical rowid. The logical rowid contains a primary key and an address identifying a datablock that likely includes the large object.

BRIEF DESCRIPTION OF THE DRAWINGS

The foregoing and other objects, features and advantages of the invention will be apparent from the following more particular description of a database system having logical row identifiers, as illustrated in the accompanying drawings in which like reference characters refer to the same parts throughout the different views. For clarity and ease of description, the drawings are not necessarily to scale, emphasis instead being placed upon illustrating the principles of the invention.

DETAILED DESCRIPTION

Figure 1:
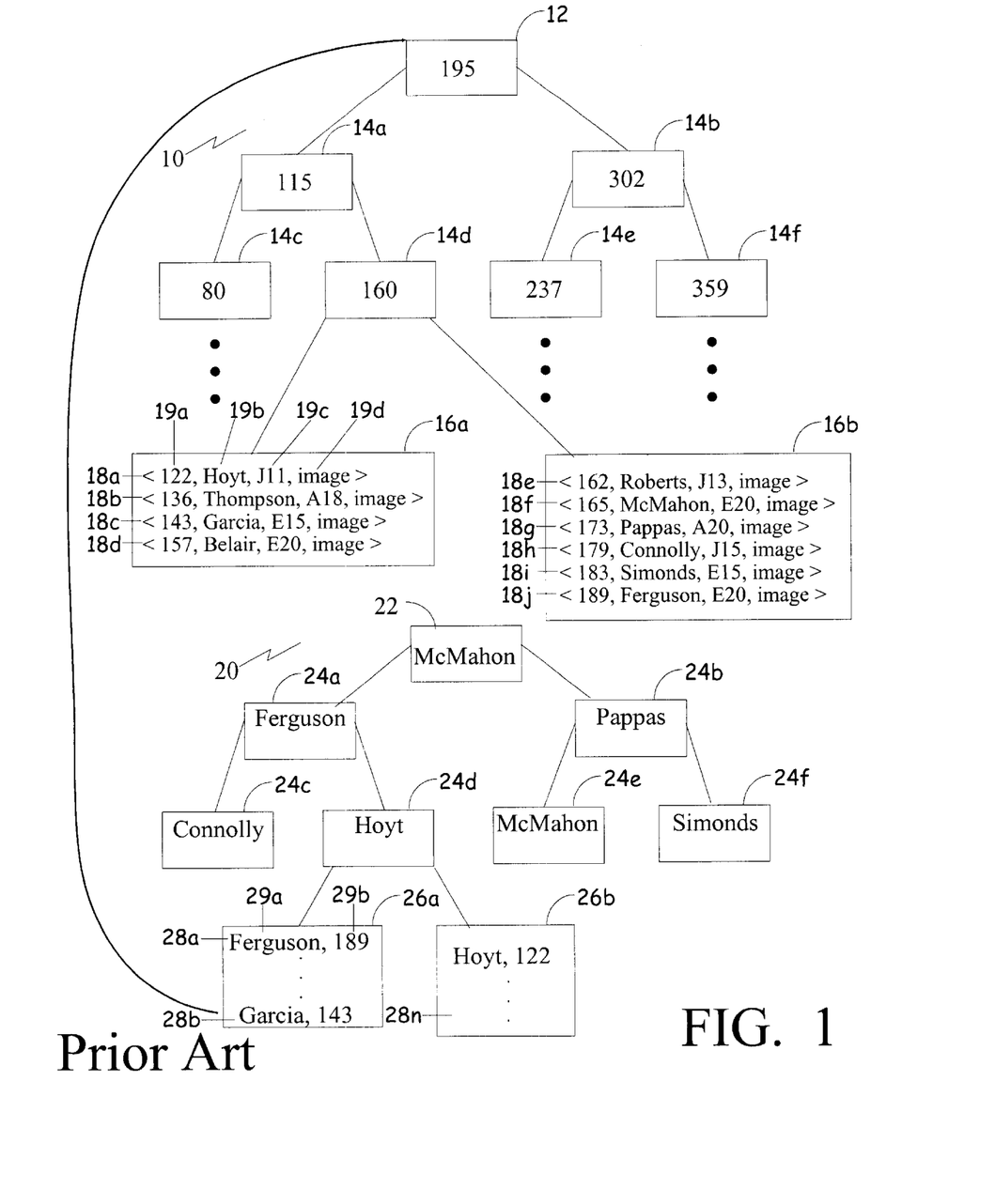
FIG. 1 is a block diagram depicting a relationship between a secondary key index and an index-organized table according to the prior art.

FIG. 1 is a block diagram depicting a relationship between a secondary key index 20 and an index-organized table 10 according to the prior art. The primary key index-organized table 10 is shown to include a root block 12, multiple branch blocks 14a–14f and two leaf blocks 16a, 16b. As is known in the art, each branch block stores one (or more) values that indicate which value ranges correspond to the blocks beneath the branch block. Each leaf block stores entries for a particular range of key values as indicated by its ancestor branch block. Although only two leaf blocks 16a, 16b are shown here, a typical arrangement would generally include a plurality of leaf blocks.

Here, the leaf blocks 16a, 16b store rows 18a–18j of an example employee database table. Columns of the table include employee identifier 19a, last name 19b, job code 19c, and an image of the employee 19d. The final column, the employee image 19d, is an example of a large object data type. Operations involving this type of column are discussed more fully with reference to FIG. 6. The index-organized table 10 is organized by the primary key employee id 19a column.

The secondary index structure 20 is organized by the employee's last name column 19b. It also includes a secondary structure root block 22, multiple branch blocks 24a–24f and, as shown, two exemplary leaf blocks 26a, 26b. The secondary index structure leaf blocks 26a, 26b include multiple entries 28a–28n. Each entry includes a secondary key value 29a and its corresponding primary key value 29b.

As mentioned above, the index-organized table 10 is organized by the primary key employee id 19a. Database queries submitted to a database server referencing the employee id 19a column as a search variable may be serviced directly by the index-organized table 10. As the data is provided in the structure in the form of a sort on the employee id 19a column, a query referencing this column may be serviced quickly by scanning the index-organized table 10.

If a query is submitted referencing one of the remaining three columns 19b–19d however, traversing the index-organized table 10 would prove an inefficient solution. Because the data is not organized by these remaining columns, a search of each entry within the entire structure is necessary. Rather, secondary index structures, such as the employee name secondary index structure 20, may be provided.

A query referencing employee's last names is serviced using the employee name secondary index structure 20. A scan of the index 20 may result in the identification of one or more entries that include the employee's last name as well as the corresponding primary key value, or employee id. If these columns, the employee last name 19b and employee id 19a, are the only columns referenced in the query, the results of the query may be ascertained from the secondary index scan. However, if one of the two remaining columns, job code 19c or image 19d, are also referenced, an additional scan of the index-organized structure 20, is necessary to fulfill the query. Here, the primary key value ascertained from the identified entry is used in a primary key scan of the index-organized structure 10.

To more fully illustrate the prior art process, a SQL statement:

SELECT id, last_name, job_code FROM emp WHERE last_name='Garcia';

is provided to a database server in a system that includes the index-organized table 10 and the employee name secondary index structure 20. The predicate of the query requests each row of the database in which the last name column 19b contains the value 'Garcia'. A scan of the secondary index structure 20 identifies an entry <Garcia, 143>. From this entry only the last name 19b and employee id 19a column values may be ascertained. To identify the corresponding job code value for the row, a primary key scan is performed on the index-organized table 10, using the primary key value 143 obtained from the entry, to identify the complete data for the row.

This second index structure scan, however, costs additional I/Os, thus slowing the performance of the database system. In a traditional heap-organized table (not shown), an associated index structure entry includes the index key value as well as a row identifer. The row identfier includes the address, within the heap-organized table, at which the associated row is stored. In this way, only a single additional I/O is required to ascertain the remaining column values once the target entry is identified in the associated index structure. A more efficient implementation of an index-organized table therefore, would mimic the qualities of the row identifier used in conjunction with a heap-organized table.

Figure 2:
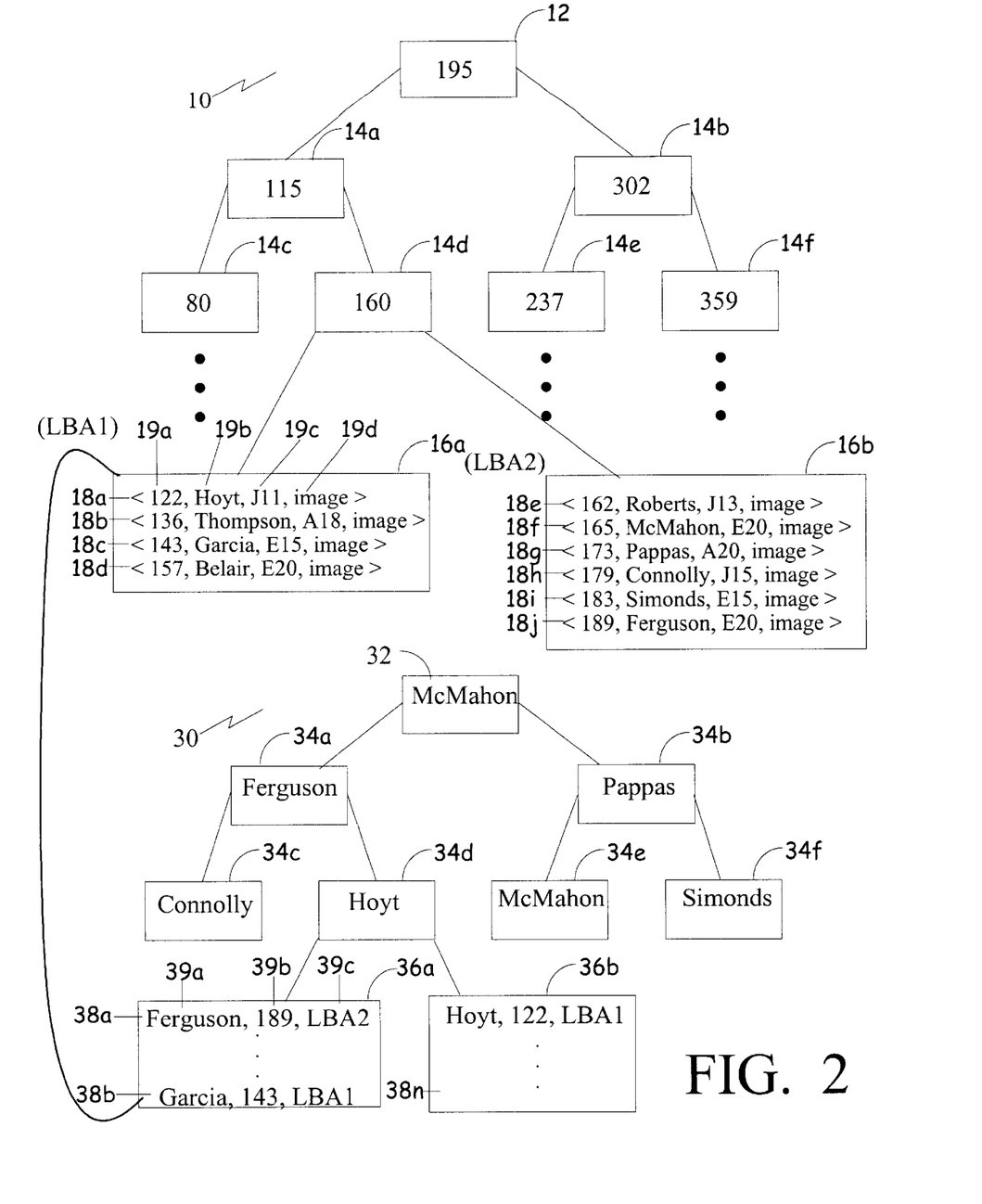
FIG. 2 is a block diagram depicting a relationship between a secondary key index and an index-organized table.

FIG. 2 is a block diagram depicting a relationship between a secondary key index and an index-organized table. The index-organized table 10 of FIG. 1 is reproduced here including the root block 12, multiple branch blocks 14a–14f and two exemplary leaf blocks 16a, 16b. The employee index-organized table is a primary key index table organized by the employee id column 19a. Each row of the table, as stored in the leaf blocks 16a, 16b, include the columns: employee id 19a, employee last name 19b, job code 19c and image 19d.

Here, the secondary index structure 30, like the secondary structure 20 of FIG. 1, includes a root block 32, multiple branch blocks 34a–34f, and two exemplary leaf blocks 36a, 36b. The secondary index structure entries 38a–38n include a secondary key value 38a, here, employee name, a corresponding primary key value 39b, here, employee id and a leaf block address 39c. The primary key value 39b and leaf block address 39c comprise a logical row identifier (rowid). The logical rowid is used in a manner similar to the row identifiers used in conjunction with heap-organized tables, as described above.

A leaf block address 39c is an address of a leaf block which most likely includes or most recently included the corresponding row information. For example, to insert a row into the index-organized table 10, a scan of the table 10 is performed to identify the leaf block into which the new row will be added. An entry (not shown) including the data for each column is inserted into the index-organized table 10 at the identified location.

Upon addition of the new row, the secondary index structure 30 is updated to reflect the addition of the new row in the index-organized table 10. A scan is done on the secondary index structure 30 to identify the proper location for a new entry (not shown) and the new secondary index entry is inserted at the identified location. The components of the secondary index entry include the corresponding secondary key value, the primary key value and an address for the leaf block where the new row was added into the index-organized table.

Subsequently, when a query is issued which references the last name column 19b of the index organized table 10, a scan is performed on the secondary index structure 30 to identify the logical rowid for the entry. The leaf block address component 39c of the logical rowid for the entry is used to identify the leaf block within the index-organized table 10 that most likely includes the row. A binary search is performed on the leaf block using the primary key value component 19b of the logical rowid to locate the row. If the row is not found, a primary key scan is performed on the index-organized table to locate the row.

Due to the nature of index-organized tables in which a specific order of the rows is maintained, rows within the table may be relocated to other leaf blocks as additional rows are added or removed from the structure. As a result, a leaf block address included in a row's secondary index structure entry may become inaccurate as the row has been relocated within the structure since the secondary index structure entry was first added. Accordingly, the leaf block address may not always be representative of the location within the index-organized table at which the row may be located. As described above, in a case in which the leaf block address is stale, a primary key scan of the index-organized table 10 is performed to locate the row.

One instance in which an entry's relocation within the index-organized structure 10 may be accurately reflected in the secondary index structure 30 is a case in which an update to a specific entry is made. Specifically, a key column update is logically equivalent to deleting the row with the old key value and inserting the row with the new key value at the appropriate place to maintain the primary key order. On deleting the old row and inserting the new row, the secondary index is updated accordingly as it would be with any new row insertion.

Figure 3:
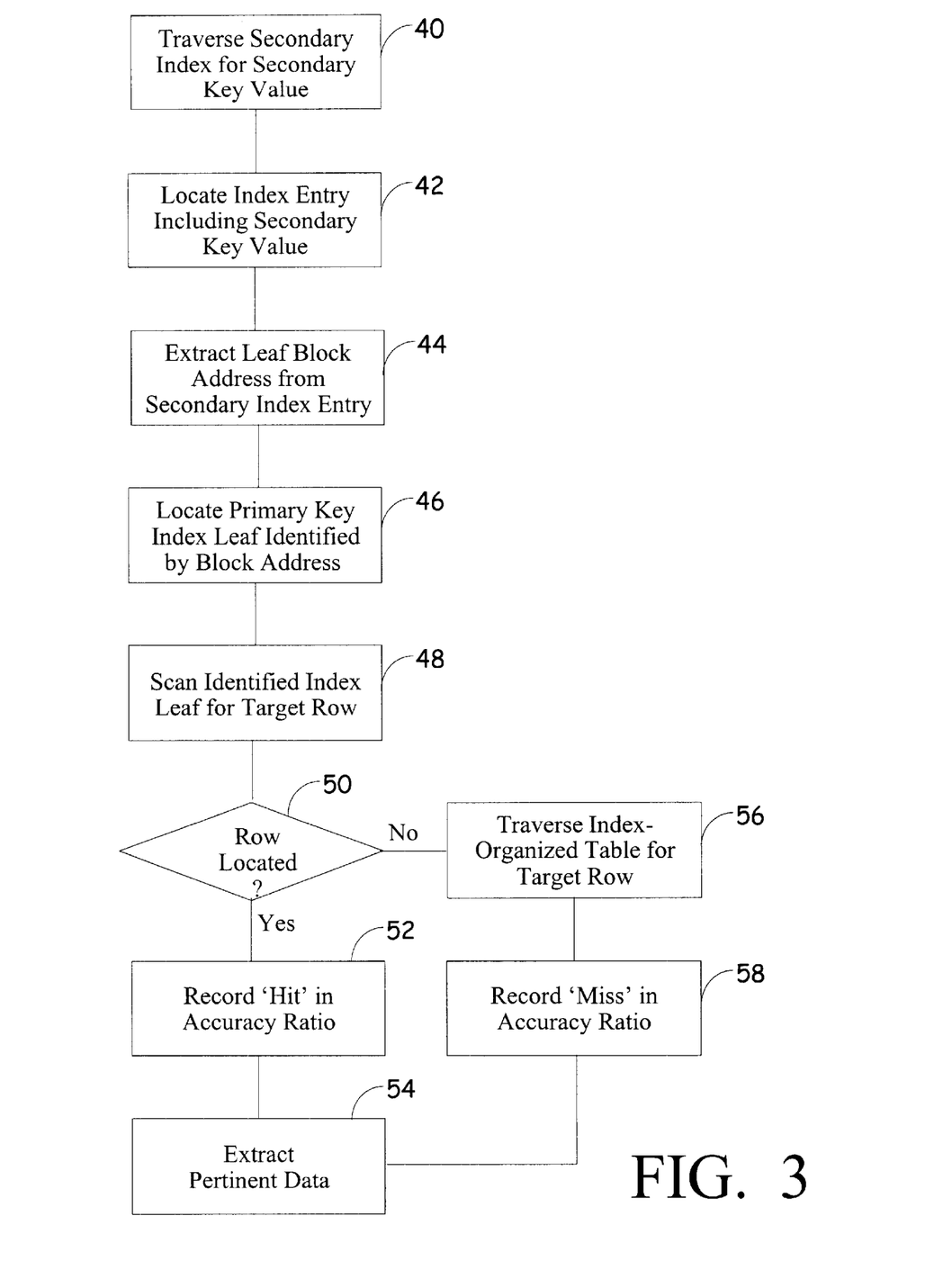
FIG. 3 is a flow diagram depicting a process for identifying a row within the index-organized table of FIG. 2 using a logical row identifier identified in the secondary key index of FIG. 2.

FIG. 3 is a flow diagram depicting a process for identifying a row within the index-organized table of FIG. 2 using a logical rowid identified in the secondary key index of FIG. 2. Reference will be made to the elements of FIG. 2 throughout the description of the process. In addition, the SQL statement as used in the description of FIG. 1 will be used again in conjunction with FIG. 3:

SELECT id, last_name, job_code FROM emp WHERE last_name='Garcia';

The example SQL statement is parsed and the optimizer determines an optimal execution plan for servicing the query, a process which will be described in more detail in conjunction with FIG. 5. Here, it may be assumed that the optimal execution plan includes using the secondary index structure 30.

At step 40, the secondary index structure 30 is traversed to locate an entry which includes a target secondary key value, here, 'Garcia'. At step 42, the entry 38b in the secondary index structure 30 that includes the secondary key value 'Garcia' is identified. At step 44, the leaf block address, LBA1 39c is extracted from the entry 38b. The leaf block address LBA1 39c, which is one portion of the logical rowid for the entry, is used at step 46 to identify a leaf block 16a within the index-organized structure 10 which may include the row including 'Garcia' in the last name column 19b.

A binary scan is performed on the identified leaf block 16a at step 48 using the primary key value 143, which is the second component of the logical rowid, provided in the secondary index entry 38b. If at step 50 it is determined that the row is located within the index-organized table 10 in the leaf block identified by the leaf block address LBA1 39c, a "hit" is recorded in an accuracy ratio at step 52.

The accuracy ratio is a value which is computed to indicate the accuracy of the leaf block address provided. That is, the accuracy ratio indicates a number of times the leaf block address accurately indicated the location of the corresponding row in the index-organized table 10. The accuracy ratio is discussed in more detail in conjunction with FIG. 4.

If the row is not located in the identified leaf block at step 50, a primary key scan of the index-organized table 10 is performed at step 56 using the primary key value provided in the secondary index entry 38b. At step 58, a "miss" is recorded in the accuracy ratio and at step 54, regardless of the method used to locate the target row, the pertinent data, here, job code, is extracted from the row.

Figure 4:
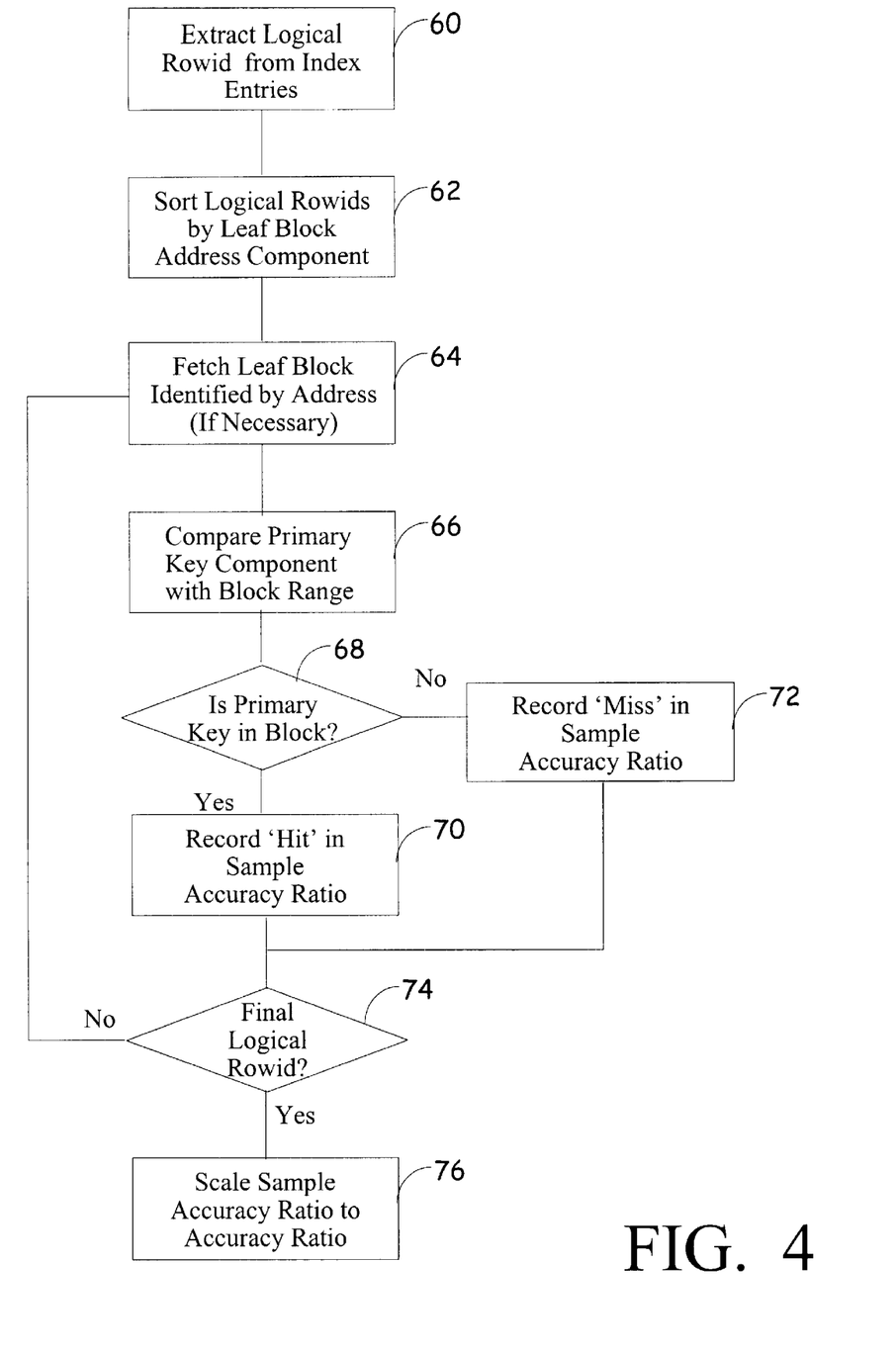
FIG. 4 is a flow diagram of a process for analyzing an accuracy of the logical row identifier of FIG. 3.

FIG. 4 is a flow diagram of a process for analyzing an accuracy of the logical rowid of FIG. 3 as a result of an ANALYZE INDEX command issued by a database administrator. As discussed in conjunction with FIG. 3, an accuracy ratio, included in metadata maintained for each index, is provided in an additional column and represents a leaf block address quality or accuracy. At the creation of an index entry, the accuracy ratio is initially set to 100 indicating that the leaf block address provided in the entry is 100% accurate in locating the corresponding row in the index-organized table 10. Each time the leaf block address is accessed in the table, this accuracy ratio is collected in the manner described in conjunction with FIG. 3 and later combined with the existing accuracy ratio.

For example, the accuracy ratio R for a leaf block may be calculated as R=(NumLBAs/NumRows) * 100 where NumLBAs is the number of addresses in the secondary index that correcly reference the leaf block, and NumRows is the number of rows in the leaf block. The accuracy ratio R can be initialized to 100 when a secondary index is created by setting NumLBAs=NumRows.

Subsequently, when a query is executed, temporary statistics, that is, "hits" and "misses", are collected. These statistics can then be combined with the accurary ratio R by updating the accuracy ratio R as follows: $R_{new}$=100 * (NumLBAs+"hits")/(NumRows+"hits"+"misses"), where NumLBAs=NumRows * $R_{current}$/100.

Obviously, this formula may not give a precise accuracy ratio, but it does provide a good estimate. For a precise accuracy ratio, the ANALYZE INDEX statement, discussed below, can be used. In addition, the accuracy ratio is set to 100 when the index is rebuilt or the incorrect LBAs are fixed.

As mentioned above, this value may be computed as part of an ANALYZE INDEX command in the following manner. At step 60, all, or a sample of the logical rowids are extracted from the secondary index structure 30 entries and are sorted in numerical order by their leaf block address component at step 62. At step 64, a leaf block identified by the first leaf block address is fetched. The primary key value component of the logical rowid is compared to the block range at step 66. That is, the first and therefore, lowest primary key value of the block is determined as is the last and therefore, highest primary key value. The primary key value component is compared to the first and last primary key values for the block. If, at step 68 it is determined that the primary key value component is within the block, a "hit" is recorded in a sample accuracy ratio at step 70. If it is not found within the block, a "miss" is recorded in the sample accuracy ratio at step 72.

At step 74 it is determined whether this is the final logical rowid to be tested. If not, flow returns to step 64 where a subsequent leaf block is fetched if necessary. The "if necessary" proviso is added as subsequent logical rowids, because they are sorted in leaf block address order, may identify the same leaf block as the previous logical rowid. As a result, the leaf block need not be refetched but simply accessed again to test the accuracy of the next rowid. At step 76, after the final logical rowid has been tested, the sample accuracy ratio is scaled to reflect the accuracy ratio for the index.

The accuracy ratio may be used to determine when a rebuild of the index-organized structure 10 is necessary as well as to guide the optimizer in selecting an optimal execution plan. FIG. 5 will be referenced to detail a process followed by the optimizer for selecting between using the logical rowids provided by the secondary index structure 30 and performing a primary key scan of the index-organized table 10 to provide a response to a query.

Figure 5:
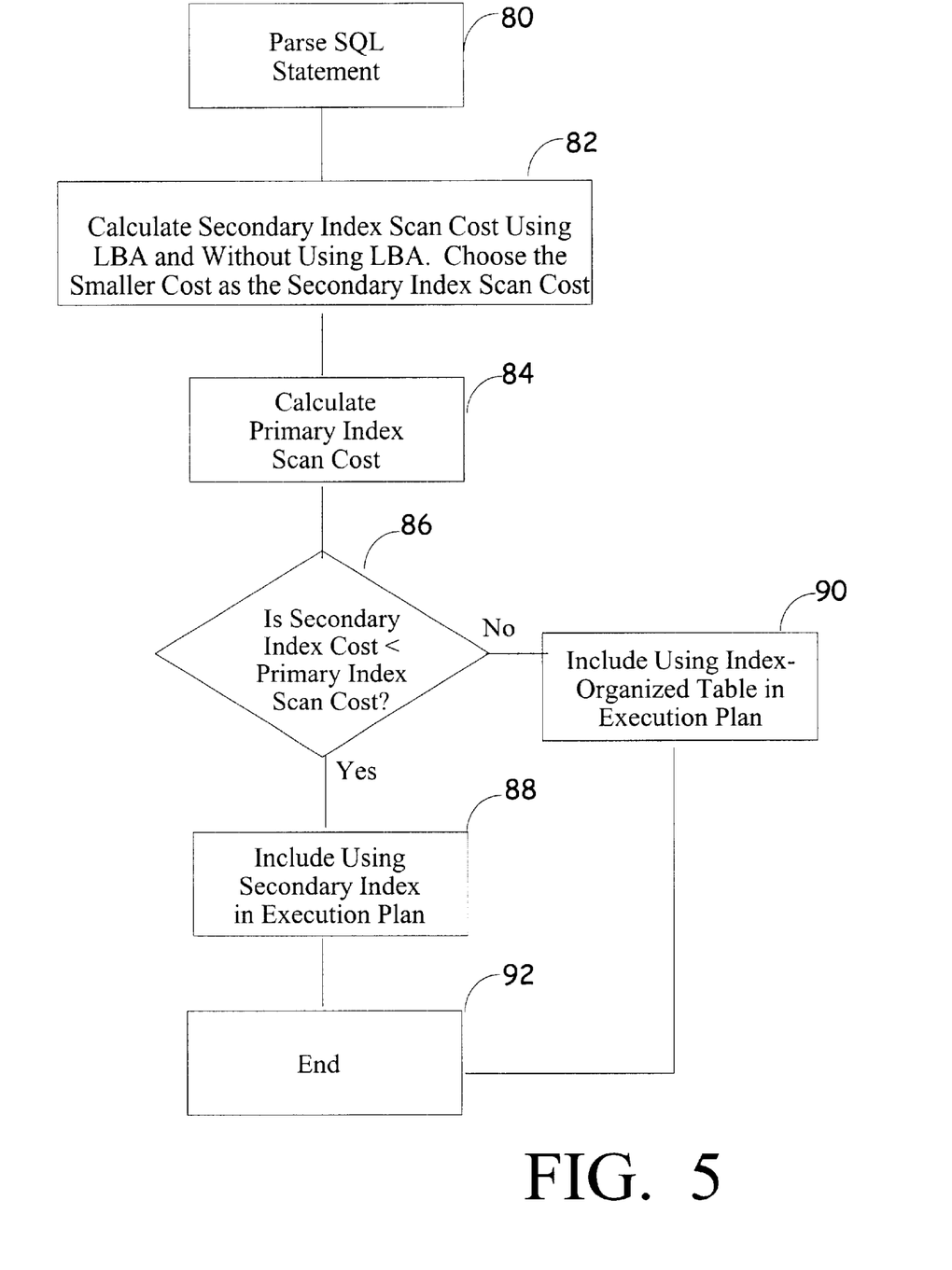
FIG. 5 is a flow diagram of a process for determining an optimal execution plan or a database query in a system including a secondary index.

FIG. 5 is a flow diagram of a process for determining an optimal execution plan for a database query in a system including a secondary index. At step 80 the SQL statement is parsed to determine what is requested by the statement. If it is determined that a secondary index-based scan may be performed to service the query, an execution cost of using the logical rowid of the secondary index to identify the row in the index-organized table is calculated at step 82. The accuracy ratio maintained for the index is used to determine the execution cost. If the accuracy ration is low, the leaf block address might not be used to access the index-organized table. Secondary index scan costs using the leaf block address and without using the leaf block address are computed and the smaller cost is chosen as the secondary index scan cost. At step 84, the cost of performing a primary index scan to locate the row is calculated.

If at step 86 it is determined that the secondary index cost is less than the primary index scan cost, using the logical rowid of the secondary index to locate the row is included in the execution plan at step 88. If it is determined at step 86 that the primary key scan of the index-organized table is more efficient, performing a primary key scan of the index-organized table to locate the row is included in the execution plan at step 90. Once the optimal method for locating the row has been selected for the execution plan, the process ends at step 92.

Figure 6:
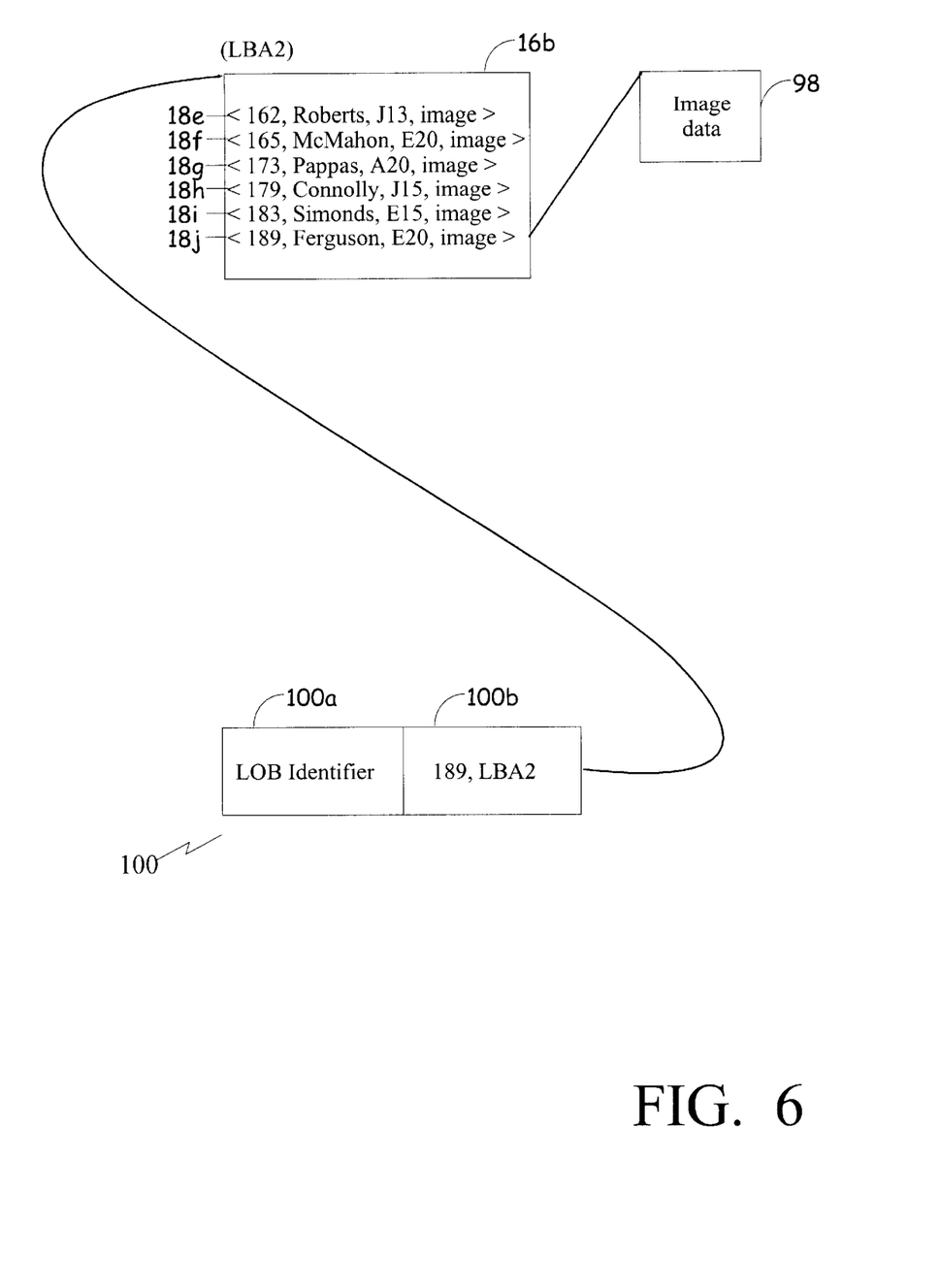
FIG. 6 is a block diagram depicting use of a logical row identifier to locate the large object included in the index-organized table of FIG. 2.

FIG. 6 is a block diagram depicting use of a logical rowid to locate the large object 19d included in the index-organized table 10 of FIG. 2. A large object datatype enables storage of large blocks of unstructured data such as text, graphic images, video clips and sound waveforms. The large object in FIG. 2 is a graphical image comprising a picture of the employee. One characteristic of a large object datatype is that it is typically stored out of line from the remaining columns of the index-organized table 10. At the location which would typically store the data for the large object column is provided a store locator which indicates a location at which the actual data for the large object may be found.

Typically, in piecewise operations involving large object data, an in-memory locator for the large object is generated in response to a SQL statement which references the large object. For an index-organized table 10 such as shown in FIG. 2, an in-memory locator 100 is generated which includes two components. The first component is a large object identifier 100a (LOB ID). The second component includes a logical rowid 100b comprised of the primary key value for the indicated row as well as the leaf block address for the leaf block of the index-organized table in which the row is most likely stored. The in-memory locator 100 is provided to the client and may be used subsequently by the client to access the large object.

During a subsequent operation which uses the in-memory locator 100 the leaf block address LBA1 is used to identify the leaf block 16b which most likely includes the row containing the large object. A binary scan is performed on the leaf block 16b to determine whether the row is contained within the identified block 16b. The binary scan specifically searches the leaf block to identify an entry including the primary key value element of the logical rowid 100b. If the row is located, the store locator 19d for the large object data is retrieved and the image data 98 may be located from the store locator 19d value.

If the row is not located within the leaf block 16b, a primary scan of the index-organized table 10 is performed. Using the primary key value element of the logical rowid 100b, the target row may be identified within the table 10. Once identified, the store locator 19d for the image may be extracted from the row and subsequently used to locate the actual image data 98.

It will be apparent to those of ordinary skill in the art that methods involved in the database system may be embodied in a computer program product that includes a computer usable medium. For example, such a computer usable medium can include a readable memory device, such as a hard drive device, a CD-ROM, a DVD-ROM, or a computer diskette, having computer readable program code segments stored thereon. The computer readable medium can also include a communications or transmission medium, such as a bus or a communications link, either optical, wired, or wireless, having program code segments carried thereon as digital or analog data signals.

While this database system has been particularly shown and described with references to particular embodiments thereof, it will be understood by those skilled in the art that various changes in form and details may be made therein without departing from the scope of the invention encompassed by the appended claims.

What is claimed is:

1. A database management system, comprising:

a processor; and a storage system in communication with the processor, the storage system comprising:

an index-organized table in which data is stored; and a secondary index, each entry of the secondary index comprising:

a secondary key value element, and a logical row identifier element which identifies a location in the index-organized table having a high probability of containing data associated with the secondary key value element, the logical row identifier element comprising:

a primary key value element, and a datablock address element identifying a leaf block in the index-organized table that has included a row corresponding to the primary key value element.

2. A database management system, comprising:

a processor; and a storage system in communication with the processor, the storage system comprising:

a large object locator, comprising:

a large object identifier; and a logical row identifier which identifies a location in the storage system having a high probability of containing a large object associated with the large object identifier, the logical row identifier comprising:

a primary key value element, and an address identifying a datablock that has included the large object.

3. A method for using a secondary index to locate a row in an index-organized table in a database management system, the method comprising:

traversing the secondary index to locate a secondary index entry that includes a target secondary key value;

identifying a logical row identifier value included in the located secondary index entry, the logical row identifier value comprising:

a primary key value, and a datablock address identifying a leaf block in the index-organized table that has included a row corresponding to the primary key value element;

accessing the leaf block in the index-organized table identified by the logical row identifier value; and scanning the leaf block to locate the row in the index-organized table that includes the target secondary key value and corresponds with the located, secondary index entry.

4. The method of claim 3 further including:

performing a primary key scan on the index-organized table if the row in the index-organized table is not located in the identified datablock.

5. The method of claim 4 further including:

gathering statistics that represent an accuracy of the logical row identifier value.

6. The method of claim 5 wherein gathering statistics includes:

calculating an accuracy ratio for the logical row identifier value, the accuracy ratio representing a complement of a number of times a primary key scan is performed versus a number of times the leaf block in the index-organized table is accessed.

7. The method of claim 6 wherein calculating an accuracy ratio includes:

sorting logical row identifier values in numerical order by their leaf block address component;

comparing the primary key value component of the logical row identifier value to the first and last primary key values for a leaf block; and determining hits and misses of the primary key value responsive to the comparison.

8. The method of claim 5 further including:

subsequently processing a database query statement that references the target secondary key value; and determining, in response to the statistics, whether the database query statement will be serviced using the secondary index or whether the database query statement will be serviced by performing a primary key scan on the index-organized table.

9. A computer program product for using a secondary index to locate a row in an index-organized table in a database management system, the computer program product comprising a computer usable medium having computer readable code thereon, including program code which:

traverses the secondary index to locate a secondary index entry that includes a target secondary key value;

identifies a logical row identifier value included in the located secondary index entry, the logical row identifier value comprising:

a primary key value, and a datablock address identifying a leaf block in the index-organized table that has included a row corresponding to the primary key value element;

accesses the leaf block in the index-organized table identified by the logical row identifier value; and scans the leaf block to locate the row in the index-organized table that includes the target secondary key value and corresponds with the located, secondary index entry.

10. The computer program product of claim 9, wherein the program code further:

performs a primary key scan on the index-organized table if the row in the index-organized table is not located in the identified datablock.

11. The computer program product of claim 10, wherein the program code further:

gathers statistics that represent an accuracy of the logical row identifier value.

12. The computer program product of claim 11, wherein the program code, in gathering statistics, further:

calculates an accuracy ratio for the logical row identifier value, the accuracy ratio representing a complement of a number of times a primary key scan is performed versus a number of times the leaf block in the index-organized table is accessed.

13. The computer program product of claim 12, wherein the program code, in calculating an accuracy ratio, further:

sorts logical row identifier values in numerical order by their leaf block address component;

compares the primary key value component of the logical row identifier value to the first and last primary key values for a leaf block; and determines hits and misses of the primary key value responsive to the comparison.

14. The computer program product of claim 11, wherein the program code further:

subsequently processes a database query statement that references the target secondary key value; and determines, in response to the statistics, whether the database query statement will be serviced using the secondary index or whether the database query statement will be serviced by performing a primary key scan on the index-organized table.

15. A computer system comprising:

one or more processors;

a memory system connected to the processors; and a computer program, in the memory, which uses a secondary index to locate a row in an index-organized table in a database management system by traversing the secondary index to locate a secondary index entry that includes a target secondary key value;

identifying a logical row identifier value included in the located secondary index entry, the logical row identifier value comprising:
a primary key value, and
a datablock address identifying a leaf block in the index-organized table that has included a row corresponding to the primary key value element;
accessing the leaf block in the index-organized table identified by the logical row identifier value; and
scanning the leaf block to locate the row in the index-organized table that includes the target secondary key value and corresponds with the located, secondary index entry.

16. The computer system of claim 15, wherein the computer program further:
performs a primary key scan on the index-organized table if the row in the index-organized table is not located in the identified datablock.

17. The computer system of claim 16, wherein the computer program further:
gathers statistics that represent an accuracy of the logical row identifier value.

18. The computer system of claim 17 wherein the computer program, in gathering statistics, further:
calculates an accuracy ratio for the logical row identifier value, the accuracy ratio representing a complement of a number of times a primary key scan is performed versus a number of times the leaf block in the index-organized table is accessed.

19. The computer system of claim 18 wherein the computer program, in calculating an accuracy ratio, further
sorts logical row identifier values in numerical order by their leaf block address component;
compares the primary key value component of the logical row identifier to the first and last primary key values for a leaf block; and
determines hits and misses of the primary key value responsive to the comparison.

20. The computer system of claim 17 wherein the computer program further:
subsequently processes a database query statement that references the target secondary key value; and
determines, in response to the statistics, whether the database query statement will be serviced using the secondary index or whether the database query statement will be serviced by performing a primary key scan on the index-organized table.

21. A database management for using a secondary index to locate a row in an index-organized table, the system comprising:

means for traversing a secondary index to locate a secondary index entry that includes a target secondary key value;
means for identifying a logical row identifier value included in the located secondary index entry, the logical row identifier value comprising:
a primary key value, and
a datablock address identifying a leaf block in the index-organized table that has included a row corresponding to the primary key value element;
means for accessing the leaf block in the index-organized table identified by the logical row identifier value; and
means for scanning the leaf block to locate the row in the index-organized table that includes the target secondary key value and corresponds with the located, secondary index entry.

22. The method of claim 21 further including:
means for performing a primary key scan on the index-organized table if the row in the index-organized table is not located in the identified datablock.

23. The method of claim 22 further including:
means for gathering statistics that represent an accuracy of the logical row identifier value.

24. The method of claim 23 wherein said means for gathering statistics includes:
means for calculating an accuracy ratio for the logical row identifier, the accuracy ratio representing a complement of a number of times a primary key scan is performed versus a number of times the leaf block in the index-organized table is accessed.

25. The method of claim 24 wherein said means for calculating an accuracy ratio includes:
means for sorting logical row identifiers in numerical order by their leaf block address component;
means for comparing the primary key value component of the logical row identifier to the first and last primary key values for a leaf block; and
means for determining hits and misses of the primary key value responsive to the comparison.

26. The method of claim 23 further including:
means for subsequently processing a database query statement that references the target secondary key value; and
means for determining, in response to the statistics, whether the database query statement will be serviced using the secondary index or whether the database query statement will be serviced by performing a primary key scan on the index-organized table.

* * * * *